July 27, 1965 E. W. ANTHON 3,197,241
COUPLING DEVICES
Filed Aug. 29, 1961 2 Sheets-Sheet 2

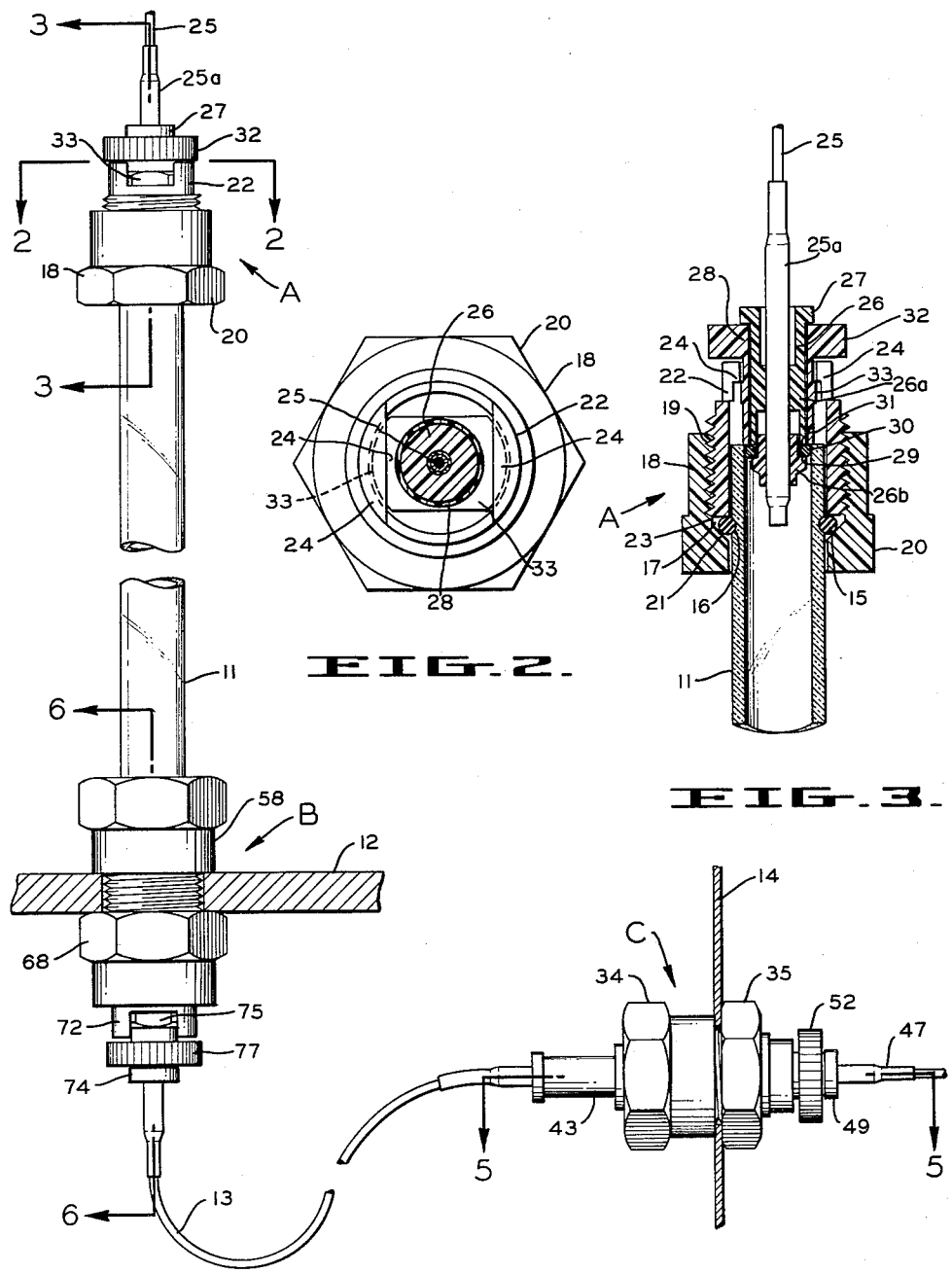

INVENTOR.
ERIK W. ANTHON
BY
Schapp & Hatch
ATTORNEYS

United States Patent Office 3,197,241
Patented July 27, 1965

3,197,241
COUPLING DEVICES
Erik W. Anthon, Kensington, Calif., assignor, by mesne assignments, to Warner-Lambert Pharmaceutical Company, Morris Plains, N.J.
Filed Aug. 29, 1961, Ser. No. 134,698
5 Claims. (Cl. 285—138)

The present invention relates to coupling devices and more particularly to coupling devices which are capable of being connected and disconnected comparatively quickly.

Various devices for coupling tubes or pipes to each other or to an apparatus have been developed. Generally, these connectors utilize screw type elements which serve to hold the component parts together and tighten any sealing means or packing. While these couplings are satisfactory for the purpose, they have the disadvantage of requiring several revolutions of rotation to operate and in some cases a tool is required to obtain a sufficient pressure to provide a seal.

It has also been a problem in prior devices to provide fittings for use with corrosive chemicals which have a long, useful life. Corrosive chemicals and excessive screwing cause damage to threads with accompanying difficulty in operating. Moreover, a trapping of material within the coupling not only causes corrosion but also causes contamination where different fluids are passed through the system. This is particularly critical in analytic devices where excessive contamination cannot be tolerated.

It is a primary object of this invention to provide a coupling which is easily connected and yet which provides a seal that is effective to hold high pressures.

Another object is to provide a coupling which is resistant to corrosion and which provides a minimum volume passage through the connector, the structure providing no hidden reservoirs in which contaminants can collect.

Further objects and advantages of my invention will be apparent as the specification progresses, and the new and useful features of my coupling devices will be fully defined in the claims attached hereto.

The preferred forms of my invention are illustrated in the accompanying drawings forming part of this application, in which:

FIGURE 1 illustrates a column utilizing two quick connectors constructed in accordance with the present invention at each end, as well as a third form of quick connector mounted in a panel;

FIGURE 2 is a cross sectional view taken along the plane of line 2—2 of FIGURE 1;

FIGURE 3 is an elevational sectional view taken along the plane of line 3—3 of FIGURE 1;

Figure 4:
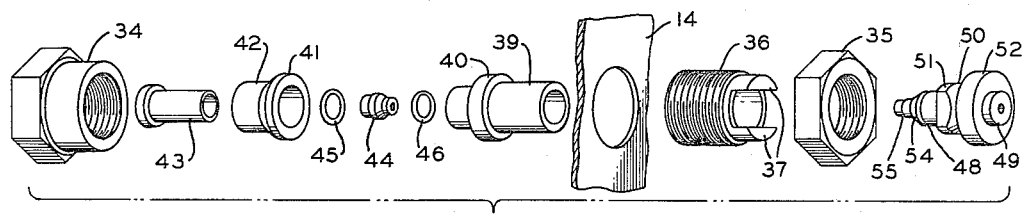
FIGURE 4 is an exploded perspective view of the various parts of the assembly for the quick coupling shown mounted on a panel in FIGURE 1.

While I have shown only the preferred forms of my invention, it should be understood that various changes or modifications may be made within the scope of the claims attached hereto without departing from the spirit of the invention.

Referring again to FIGURE 1, there is shown a column 11 supported by a floor 12. At the upper end of the column 11 there is a fitting generally designated as A, and at the bottom of the column, there is a fitting B which serves to provide a tight, easily removable connection to a tube 13 as well as anchoring the column 11 to floor 12. Tube 13 is in communication with fitting C which is mounted in panel 14.

As will be more apparent from the description given below, the easily connectable and disconnectable fittings provide a set-up which is readily adaptable to change and is therefore suitable for the easy introduction of a plurality of fluid charges for obtaining a plurality of runs in a short period of time.

Referring now to FIGURES 1, 2 and 3, it is seen that fitting A fits over the upper end of column 11 by having a female section or housing telescoped thereover. An anchor is effected between the female section of fitting A and the column by means of an O-ring 15 which is seated in a circumferentially extending groove 16 on the column 11 and fits into an annular space 17 of fitting A. The ring may be made of natural or synthetic rubber or any other resilient material capable of stretching for assembly over the end of the column and contracting to fit groove 16 within the space 17 and forming a tight grip upon being compressed therein. This arrangement provides an anchor of the fitting on the glass tube without undue strain on the glass.

Fitting A comprises a nut 18 having an internally threaded portion 19 and a hexagonal portion 20. The nut contains a conical inner shoulder 21 which effects an inwardly inclined force (with respect to the axis of the column) on the O-ring 15. Threadably connected to the nut 18 is a sleeve 22 having a shoulder 23 at one end which cooperates with shoulder 21 to provide the annular space 17. Thus the nut 18 and sleeve 22 cooperate to form a housing consisting of at least two elements which may be disassembled to provide access to the annular space 17. At the other end of the sleeve 22 are a pair of flanges 24 adapted to receive a bayonet connection.

The male section of fitting A fits within the female section and into the end of the column. Tube 25 is permanently secured within the male section and communicates through the fitting and into the column 11. As here shown, tube 25 has an enlarged end section 25a containing additional thicknesses of tubing to provide increased strength and stiffness. Secured to the tube 25 at the enlarged end section 25a is a cylindrical member 26 having an outer surface slightly smaller than the inner surface of the column 11 into which it is adapted to fit. At the outer end of the member 26 is a flanged end 27 forming a stop for the connector 28, which connector is slidably assembled over the cylindrical member 26. Thus the connector 28 and cylindrical member 26 are assembled to form a resilient plastic device consisting of at least two telescoped resilient plastic members. At the inner end of member 26 is a circumferentially extending groove 29 into which an O-ring 30 is fitted. As here shown, the member 26 consists of two telescoping parts 26a and 26b which cooperate to form the groove 29. The O-ring 30 is of a size sufficient to slide snugly into the column 11 and form a seal. The O-ring also tends to hold the connector 28 in place relative to the column. In addition, the wall 31 of connector 28 also supports the O-ring and holds it in position against internal pressure. Connector 28 has an enlarged portion 32 roughened on the outer surface for gripping by hand. The connector also has bayonet lugs 33 which grip flanges 24 of sleeve 22 of the female portion of the connector. This attachment also fixes the position of the O-ring 30 within the column.

The O-ring 30 within the column serves the double purpose of sealing the end of the column and cushioning the fitting to column contact. In fact, the contacts between the entire fitting A and the column are generally effected through the O-rings 15 and 30. As explained above in regard to O-ring 15, O-ring 30 is made of a resilient elastic material such as natural or synthetic rubber and is of such a size that it is tensioned within the groove 29. The O-rings utilized in the other embodiments discussed below are similarly constructed and fitted.

Preferably, the sample or fluid-contacting parts of fitting A are made of a resilient, self-lubricating and chemically inert plastic such as polytetrafluoroethylene. This material is available under the trade name Teflon. The O-rings are preferably made of a fairly hard rubber such as neoprene or the like, and the outer portions of the fitting may be formed of nylon. With such an arrangement it is possible to quickly connect a section of tubing to a glass column without danger of breaking the glass.

The fittings B and C are also preferably made of similar materials in order to achieve the cushioning effect and the desired resistance to corrosion and contamination.

Figure 5:
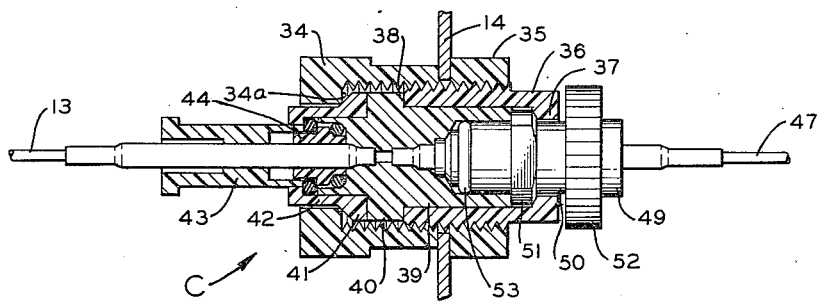
FIGURE 5 is a sectional view of the quick coupling of FIGURE 4 taken substantially on the plane of line 5—5 of FIGURE 1.

Referring now to FIGURES 1, 4 and 5, there is shown fitting C adapted to fit within and grip the edges of an opening in a panel. The grip is effected by a bushing 34 and a nut 35 which threadably engage a sleeve 36, with the panel 14 being clamped therebetween. The sleeve 36 has internal flanges 37 at one end thereof formed to receive a bayonet lug. Bushing 34 has a shoulder 34a which cooperates with a confronting shoulder 38 on sleeve 36 to retain plug 39. A collar 40 formed on plug 39 and a flange 41 formed on a sleeve 42 are gripped between shoulders 34a and 38. The plug 39 and sleeve 42 mount a sleeve 43, through which tube 13 passes. A sealer member 44 and a pair of O-rings 45 and 46 removably seal sleeve 43 to sleeve 42 and plug 39, as shown in FIGURES 4 and 5. In this way tube 13 is tightly held within plug 39 and its opening in communication with the central opening of plug 39.

The male portion of fitting C is similar in construction to the male portion of fitting A and has a tube 47 similar to tube 25 of FIGURE 3 secured therein. Attached to tube 47 is a member 48 which contains a flanged end 49 formed to act as a stop for a connector 50 and its associated bayonet lug 51 and grip 52. At the inner end of member 48 is an O-ring 53 seated in a groove on the member 48 and holding connector 50 in place. The inner end of member 48 has the tube 47 extending somewhat beyond it and has a beveled section 54 and a cylindrical portion 55. These contours are matched by the contours of the central opening of plug 39.

A tight seal is obtained by making the parts of such dimensions that a forced fit is necessary to turn the bayonet lock in position. In order to achieve this, the parts are composed of a resilient plastic that deforms slightly when the connector is fastened, but which retains its resiliency even after being in place for a considerable period of time. It is also important to have lubrication between the parts which are expected to slide past one another under force required to compress the part during rotation of the male member as locking is effected, but lubricants which might contaminate a sample are not permissible. Therefore it is a feature of this invention to provide a self-lubricating plastic. As indicated earlier, polymers of fluoroethylene are suitable.

From the above it is seen that the plastic plug 39 and the parts of the male member which fit therein are made of Teflon, that is polytetrafluoroethylene, in order to provide self-lubricating and resilient properties. In addition, Teflon is characterized by excellent chemical inertness and therefore all fittings which have walls in contact with fluid or sample passing therethrough are made of this material. On the other hand, the threaded and other outside parts are preferably made of a stronger, more inexpensive material such as nylon. In this way, excellent mechanical strength is combined with excellent chemical resistance and smooth, easy operation of parts.

Figures 6, 7:
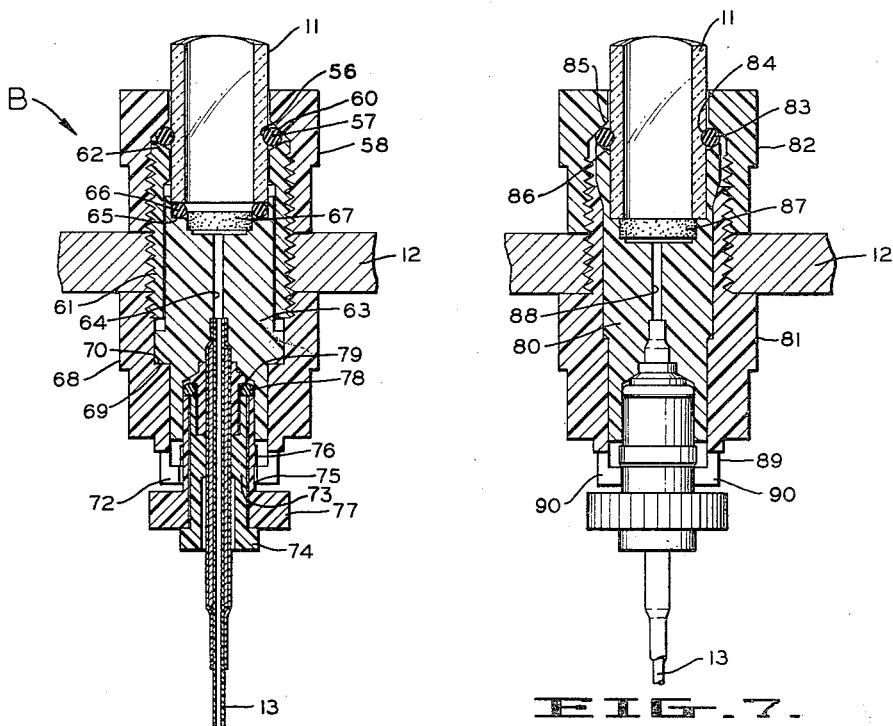
FIGURE 6 is a sectional view taken along the line 6—6 of FIGURE 1.
FIGURE 7 is a sectional view similar to that of FIGURE 6, but showing an alternative form of the quick coupling column connector.

Referring now to FIGURES 1 and 6, there is shown a preferred form of quick connector adapted to fit on the glass column. In general, this form utilizes the column attachment of fitting A, and the tight minimum volume connection between the male and female parts utilized in fitting C. In addition, it is constructed to hold the column to a floor or support 12.

Near the lower end of column 11 is a circumferentially extending groove 56 containing an O-ring 57. A bushing 58 fits over the ring 57 and presents a beveled shoulder 60 bearing against the O-ring. Threadably connected with bushing 58 is collar 61 having a beveled shoulder 62 which cooperates with the beveled shoulder 60 to squeeze O-ring 59 inwardly upon tightening of the bushing on the collar. This provides a secure gripping attachment of fitting B on the glass column with minimal strain on the glass. Use of plastic parts also insures against harmful metal to glass contact.

Fitting over the lower end of the column 11 and within collar 61 is a plastic plug 63 having a central opening 64 corresponding in diameter with tube 13. This plug has a shoulder 65 bearing against an O-ring 66 which in turn bears against the end of the column 11. Also provided within the plug 63, at the end of the column, is a space adapted to accommodate a filter element 67 when desired. The plastic plug 63 is held in place by means of a nut 68 having an internal shoulder 69 which bears against a shoulder 70 on plug 63. Nut 68 also is threaded on collars 61 for urging plug 63 toward column 11 and for clamping floor 12 against bushing 58. Nut 68 also contains a pair of internal flanges 72 adapted to receive a bayonet lug.

The male end of fitting B is similar to the male end of fittings A and C, having a tube 13 similar to tubes 25 and 47 secured therein, and contains other similar parts. Attached to tube 13 is a member 73 having a flanged end 74 that acts as a stop for a connector 75 and the bayonet lug 76 and grip 77 carried on the connector 75. At the inner end of member 73 is an O-ring 78 seated in a groove 79 thereon. Thus, O-ring 78 serves as a stop to hold connector 75 in place between the O-ring and flange 74 and also as a seal between the male and female parts of the fitting B. The inner end of the male section of fitting B has contours similar to those for the equivalent part of fitting C, and these contours are matched by the central opening of plug 63. A tight seal is obtained by using a force fit as in fitting C above.

FIGURE 7 illustrates an alternative form of the column connector shown in FIGURE 6. In this embodiment, the female end of the connector consists of plastic plug 80, screw 81 and nut 82. Again an O-ring 83 is located in a groove 84 near the lower end of the column. This is squeezed between inclined surfaces 85 and 86 of nut 82 and plug 80, respectively. In this way, the O-ring serves the double purpose of anchoring the fitting to the column and also of sealing the plastic plug to the column. As in FIGURE 6, the plastic may carry a filter element 87 within and has a minimum size central opening 88. Screw 81 has an opening at its lower end 89 and carries a pair of internal flanges 90 to receive a bayonet lug. The male end of the fitting is the same as that of FIGURE 6 and reference is made to that description both as to structure and as to function.

From the foregoing it will be seen that I have provided a novel coupling device which is easily connected and disconnected yet which provides a seal effective to hold high pressures and also provides a minimum volume passage therethrough.

I claim:

1. A quick connect coupling for connecting a plastic tube to a glass column comprising: a circumferential groove extending around said glass column near one end thereof, a resilient O-ring fitted within said groove, a housing comprised of at least two elements encompassing said O-ring and extending beyond said one end of said glass column, a flange on one of said housing elements abutting the O-ring and cooperating with the end of the second housing element to secure said O-ring, a resilient plastic device consisting of at least two telescoped resilient plastic members, one of said members fitting within one of said elements and abutting said glass column and the other of said members within said housing, flange means on one of said members, flange means on one of said elements, said two flange means arranged to effect a bayonet connection between said device and said housing, so that on relative rotation of the device to the housing, said device is pressed against said column and held in compression by said connection, said device having a passage to receive said plastic tube, and a sealing means provided between said member and said glass column to seal the passage between said tube and said glass column.

2. The quick connect coupling defined in claim 1, in which the plastic plug is composed of polytetrafluoroethylene whereby elastic forces on self-lubricating surfaces are provided while connecting at the relatively rotating surfaces.

3. A quick connect coupling for connecting a plastic tube to a glass column comprising: a circumferential groove extending around said glass column near one end thereof, a resilient O-ring fitting within said groove, a housing comprised of at least two elements encompassing said O-ring and extending beyond said one end of said glass column, a flange on one end of one of said housing elements abutting the O-ring, and flange means on the other of said housing elements at the opposite end thereof, a resilient plastic plug fitted within said housing having an end extending over the end of said glass column and abutting the O-ring to cooperate with said first mentioned flange to provide a clamping engagement on said O-ring, said plug having a passage in sealed communication with a fluid line including the glass column, a resilient plastic device, comprised of at least two telescoped plastic members, fitted within and abutting said plug, said plastic device having a passage to receive said plastic tube, said plastic device and said plug having matching mating contours, and sealing means provided between said device and said plug for sealing the passage within said plug to the tube within said device.

4. The quick connect coupling defined in claim 3, in which the housing is mounted on a floor.

5. The quick connect coupling defined in claim 3, in which a filter is held on the end of th eglass tube by the plastic tube and all other surfaces defining the fluid passage except the glass tube and O-rings are composed of polytetrafluoroethylene.

References Cited by the Examiner

UNITED STATES PATENTS

| | | | |
|---|---|---|---|
| 1,009,031 | 11/11 | Millea | 285—177 X |
| 1,070,266 | 8/13 | Koutkine | 285—138 |
| 1,665,346 | 4/28 | Clarke | 285—177 |
| 1,893,181 | 1/33 | Rumatz | 285—423 |
| 2,068,837 | 1/37 | Aronson | 210—446 X |
| 2,264,815 | 12/41 | Thomson | 285—239 |
| 2,265,267 | 12/41 | Cowies | 285—402 |
| 2,653,040 | 9/53 | Calluppi | 285—414 |
| 2,729,228 | 1/56 | Stevenson | 137—550 X |
| 2,788,992 | 4/57 | Vienne et al. | 285—177 X |
| 2,799,521 | 7/57 | Knapp | 285—281 |
| 3,004,780 | 10/61 | Main | 285—423 |

FOREIGN PATENTS

| | | |
|---|---|---|
| 1,155,238 | 11/57 | France. |
| 334,284 | 9/30 | Great Britain. |

CARL W. TOMLIN, *Primary Examiner.*

ANDREW JUHASZ, *Examiner.*